United States Patent
De Groot

(10) Patent No.: US 9,185,875 B2
(45) Date of Patent: Nov. 17, 2015

(54) METHOD OF DETECTING A FLOW, DETECTION DEVICE, AUTOMATIC MILKING DEVICE AND COMPUTER PROGRAM

(71) Applicant: LELY PATENT N.V., Maassluis (NL)

(72) Inventor: Pieter Gerlof De Groot, Giessenburg (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/627,053

(22) Filed: Sep. 26, 2012

(65) Prior Publication Data

US 2013/0019806 A1 Jan. 24, 2013

Related U.S. Application Data

(63) Continuation of application No. PCT/NL2011/000014, filed on Mar. 3, 2011.

(30) Foreign Application Priority Data

Mar. 29, 2010 (NL) .................................. 1037835

(51) Int. Cl.
  *A01J 5/01* (2006.01)
(52) U.S. Cl.
  CPC ........................ *A01J 5/01* (2013.01)
(58) Field of Classification Search
  CPC .................................. A01J 5/01; A01J 5/007
  USPC ........ 119/14.01, 14.08, 14.14, 14.15, 14.17, 119/14.18
  IPC .................................................. A01J 5/01,5/007
  See application file for complete search history.

(56) References Cited

U.S. PATENT DOCUMENTS

| | | | | |
|---|---|---|---|---|
| 4,011,838 A * | 3/1977 | Nordegren et al. | ........ | 119/14.08 |
| 4,306,517 A * | 12/1981 | Nakamura | ................. | 119/14.14 |
| 4,346,596 A | 8/1982 | Diamant et al. | | |
| 4,348,984 A * | 9/1982 | Brayer | ....................... | 119/14.08 |
| 4,485,763 A * | 12/1984 | Icking | ......................... | 119/14.17 |
| 4,604,969 A * | 8/1986 | Larson | ........................ | 119/14.36 |
| 4,714,048 A * | 12/1987 | Jefferies et al. | ............. | 119/14.08 |
| 4,922,855 A * | 5/1990 | Tomizawa et al. | ......... | 119/14.15 |
| 5,016,569 A * | 5/1991 | Moskvin | .................... | 119/14.08 |
| 6,823,817 B2 * | 11/2004 | van den Berg et al. | ..... | 119/14.02 |
| 7,063,043 B2 * | 6/2006 | Brown et al. | ............... | 119/14.15 |
| 2002/0148407 A1 | 10/2002 | Brown et al. | | |
| 2002/0156589 A1 | 10/2002 | Fematt | | |
| 2007/0209595 A1 * | 9/2007 | Umegard et al. | .......... | 119/14.02 |

FOREIGN PATENT DOCUMENTS

| | | |
|---|---|---|
| EP | 0 657 098 A1 | 6/1995 |
| WO | WO 00 75610 A1 | 12/2000 |
| WO | WO 03 042637 A1 | 5/2003 |

* cited by examiner

*Primary Examiner* — Lisa Tsang
(74) *Attorney, Agent, or Firm* — Hoyng Rokh Monegier LLP; Minerva Rivero; David P. Owen

(57) ABSTRACT

Milk flow detecting method and device monitors a flow of milk in a milk line which is connected to a teat cup and which has an aeration opening, like in a milking device. For this purpose, the milk filling level is monitored in a measuring section of the line. If the variation therein is too little, the absence of a flow, or at least an inadequate flow, is established. If, additionally, a (sufficient) filling level is detected, it can be concluded that there is an obstructed aeration opening.

7 Claims, 2 Drawing Sheets

METHOD OF DETECTING A FLOW, DETECTION DEVICE, AUTOMATIC MILKING DEVICE AND COMPUTER PROGRAM

CROSS REFERENCE TO RELATED APPLICATIONS

This application is a continuation of PCT application number PCT/NL2011/000014 filed on 3 Mar. 2011, which claims priority from Netherlands application number NL 1037835 filed on 29 Mar. 2010. Both applications are hereby incorporated by reference in their entireties.

BACKGROUND OF THE INVENTION

1. Field of the Invention

The present invention relates to a method of detecting a flow of milk in a milk line which is connected to a teat cup having a pulsator space and which has an aeration opening, wherein the milk defines a filling level in a measuring section of the milk line, wherein the method comprises applying a milking vacuum in the milk line and a pulsating vacuum in the pulsator space of the teat cup. Such a detection of a flow of milk is of importance in a milking process.

2. Description of the Related Art

Document WO00/75610, which is hereby incorporated by reference in its entirety, describes a method and system for milk flow detection in a milking process, wherein a frequency analysis is carried out on a flow signal, which frequency analysis relates to the frequency of the pulsator.

This known method requires a fairly complex analysis device. Additionally, this method has the disadvantage of only being able to be active in a limited section of the milk line, because the action of the pulsator, and in particular the frequency thereof, should be found in a reliable manner in the flow of milk. However, this will often be impeded by friction of milk with the lines and by milk and admitted air flowing together through the lines.

BRIEF SUMMARY OF THE INVENTION

This object is achieved by the invention by means of a method of detecting a flow of milk in a milk line which is connected to a teat cup having a pulsator space and an aeration opening, wherein this method comprises:
  measuring the filling level of the milk in the measuring section at least during a first period of time;
  determining a variation of the filling level measured at least during the first period of time in the form of an indicator number;
  comparing the indicator number and a predetermined threshold value, which threshold value is indicative of the presence or absence of a flow of milk in the milk line.

The present invention makes use of the insight that, in the case of milking processes in which milk is displaced by pumping, irregularities in the flow of milk will occur, which irregularities can be completely unrelated to the frequency with which the pumping takes place. The irregularities indicate that there is indeed a flow of milk. The degree of irregularity is expressed in an indicator number, more details of which will be given below. Said indicator number is subsequently compared with a threshold value, which has for example been determined on the basis of calibration measurements, in order to establish whether there is indeed a flow of milk in the milk line. For example, in the case of a more or less complete obstruction, no flow will take place and consequently no variation will occur. For this purpose, and in general in the invention, it is not necessary to know the size of the flow of milk, but only the filling level, which can be determined in a very simple manner.

Document WO03/042637, which is hereby incorporated by reference in its entirety, describes a method in which the flow of milk is determined on the basis of the determining of a cross-sectional surface area of a milk flow profile in a first cross-section of a milk line, the recording of the same filling level in a second cross-section of the milk line and the time between said measurements, on the basis of which the rate of flow can be determined, in which case the flow of milk is the product of surface area and rate. This document does not relate to the present problem of establishing whether there is indeed a flow of milk. Moreover, the document cannot result in the present invention, because, although it determines the flow of milk volume at a plurality of moments and a total flow of volume by integration, it still does not determine an indicator number for the variation itself. And said variation is exactly what is used in the present invention to determine whether there is indeed a flow of milk. It should be noted that WO03/042637, as a result of integration of a constant, provides a linearly increasing function of time, whereas the present invention, as a result of a constant, provides an indication that there is no flow of milk.

A comparable method is also known from US patent application US 2002/0148407 which is hereby incorporated by reference in its entirety. However, this method has the same drawback as the method of WO03/042637, because purely the same filling level of a milk line in two cross-sections is measured as well as the time between said measurements.

In the present invention, by filling level is meant in particular the (linear) level of the milk in the measuring section. For, variations, wrinklings at this level are meant. Said level can, for example, be determined by means of feelers, a vertical range of optical or conductivity sensors or the like, ultrasonic technique, etcetera. As an alternative for the linear level, a quantity coupled to said level, such as the cross-sectional surface area, which is also designated by "filling level", can also be determined. If this level varies, i.e. the surface area varies, this is also an indication of the presence of a flow of milk.

In embodiments, the determining of the indicator number comprises the determining of one of the maximum variation, the variance or the standard deviation of the filling level measured at least during the first period of time. In particular, the indicator number is found by dividing the result of the determination by the average of said measured filling level. Each of the above-mentioned manners has proved to be suitable to achieve a reliable indication, wherein the dividing by the average filling level ensures a relative independence of the actual filling level. It is pointed out that mathematical equivalents thereof, such as a minimum size of a derived function etcetera, are also supposed to fall within the scope of protection.

The method comprises in particular the step of milking a dairy animal, during which milking run the filling level is detected. In the case of milking it is of particular importance to detect a flow of milk, in order to prevent that milking takes place without milk being drawn. In particular, the so-called blind milking may cause inconvenience, udder damage and worse. However, the method can also be applied to, for example, cleaning of the milking equipment, in which case cleaning liquid or other liquid is pumped off through the teat cup and the milk line. In that case, the absence of a flow of milk may indicate, for example, an obstruction, or the completion of the cleaning.

In particular, the first period of time amounts to at least 20 seconds, advantageously to at least 30 seconds. Such a period of time appears to provide a reliable measurement in practice, in particular in the case of milking processes. In the case of other processes, in particular those with high rates of flow, a shorter period of time can be taken as well.

In particular, the absence of a flow of milk is established if the indicator number is smaller than the threshold value. In this case, it is assumed that the flow of milk will not, or at least not during the whole first period of time, be uniform to such an extent that the indicator number will remain below the threshold value. In particular, the method further comprises the emission of a warning signal comprising the absence of a flow of milk. In other words, this warning signal indicates an absence of the flow of milk. It will also be obvious that no variations can occur if there is no flow of milk at all. As already indicated above, this is in particular of importance for milking processes.

In particular, a filling level measurement is carried out at regular intervals, and the variation is taken as the absolute difference between two successive measurements. This can be considered as an approach of the absolute value of the derived function, and is also shown in, for example, FIG. 2. If this absolute difference, at least for example averaged over the first period of time, is below the threshold value, the absence of a flow is established. Of course, it is also possible to measure the filling level substantially continuously, in which case, for example by geometric or other signal processing techniques, the variation is determined, and, on the basis thereof, the indicator number.

In embodiments, an obstruction of the aeration opening is established if the indicator number is smaller than the threshold value, and the filling level measured, in particular averaged during the first period of time, is above a filling level threshold value. These important embodiments make use of the following insight. As known per se, during milking air is admitted to enhance the flow of milk. For this purpose, there is provided an aeration opening (bleed hole), which is situated before the location of the measuring section for measuring the filling level when viewed in the direction of flow. Said afflux of air is in principle only indirectly coupled to the pulsator frequency. On the contrary, the aeration opening is partially meant to level the initially pulsed flow. The presence of the aeration hole results in air being added to the milk. In general, this air will have, for some time, an agitating effect on the flow of milk (which is now a two-phase flow) and especially on the milk surface, in particular in the form of air bubbles, so that the filling level will vary. If the aeration opening would get obstructed, less or no more air will be added to the flow of milk. On the one hand, this results in that the flow of milk, the liquid surface will become calmer and will thus show less variation, but on the other hand this also results in that the flow as a whole will be more difficult or will even come to a complete standstill. Although the variation in the filling level is then very small, the possibility of a completely absent level of liquid still exists, which is actually not an indication of a malfunction but of an absence of liquid. However, if the aeration opening is obstructed during a milking run, there is indeed a presence of milk in the milk line, in other words there is detected a filling level. And that combination is then an indication of the obstruction, to which can be responded by means of an alarm signal. The operator can then be alerted to take corrective measures. One embodiment therefore comprises the emission of an alarm signal which comprises the message that the aeration opening may be obstructed.

In one embodiment, the method comprises the continuation of the milking according to a predetermined expected milking duration, in particular instead of on the basis of a measured flow of milk through said teat cup. This is in particular of importance in those cases in which a flow of milk is still detected, but in which that flow is so small, at least smaller than could be expected on the basis of historical values, that an at least partial obstruction of the aeration opening is established. Since the milking then becomes more difficult, and complete milking out then entails the risk of inconvenience or teat damage, it is then safer to switch to a milking regime in which the milking is not stopped when a flow of milk is reached/has come below a certain level. For, said flow of milk is determined on the basis of a filling level, which filling level now decreases more slowly than normally.

In particular, the measuring of the filling level of the milk in the milk line starts after a second period of time, which precedes the first period of time, has elapsed and, more in particular, this embodiment comprises the measuring of the filling level during the second period of time, and the starting of the measuring of the filling level during the first period of time after the filling level measured in the second period of time exceeds a predetermined threshold thereof. The intrinsic starting variation, which, of course, is not relevant to the method, is thus not taken into account. Alternatively, the second period of time may also be a fixed period of time, which can be carried out in an even simpler manner.

According to further aspects of the present invention, the invention relates to a detection device for detecting a flow of milk in a milk line which is connected to a teat cup having a pulsator space and which has an aeration opening, wherein the milk defines a filling level in a measuring section of the milk line, wherein the detection device comprises a detector which is configured to measure, during a first period of time, the filling level in the measuring section of the milk line and to emit a filling level signal, and a control member with an input for receiving the filling level signal, which control member is configured to determine a variation of the filling level measured at least during the first period of time in the form of an indicator number, and to compare the indicator number with a predetermined threshold value, which threshold value is indicative of the presence or absence of a flow of milk in the milk line. Said detection device incorporates in principle the same advantages as the method described above. For this reason, the advantages and particularities already mentioned above will, for the sake of brevity, not be described again.

The invention also relates to an automatic milking device for milking dairy animals such as cows, provided with at least one teat cup and with a detection device according to the invention, and to a computer program comprising program instructions for carrying out the method according to the invention when the program has been loaded in a computer.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
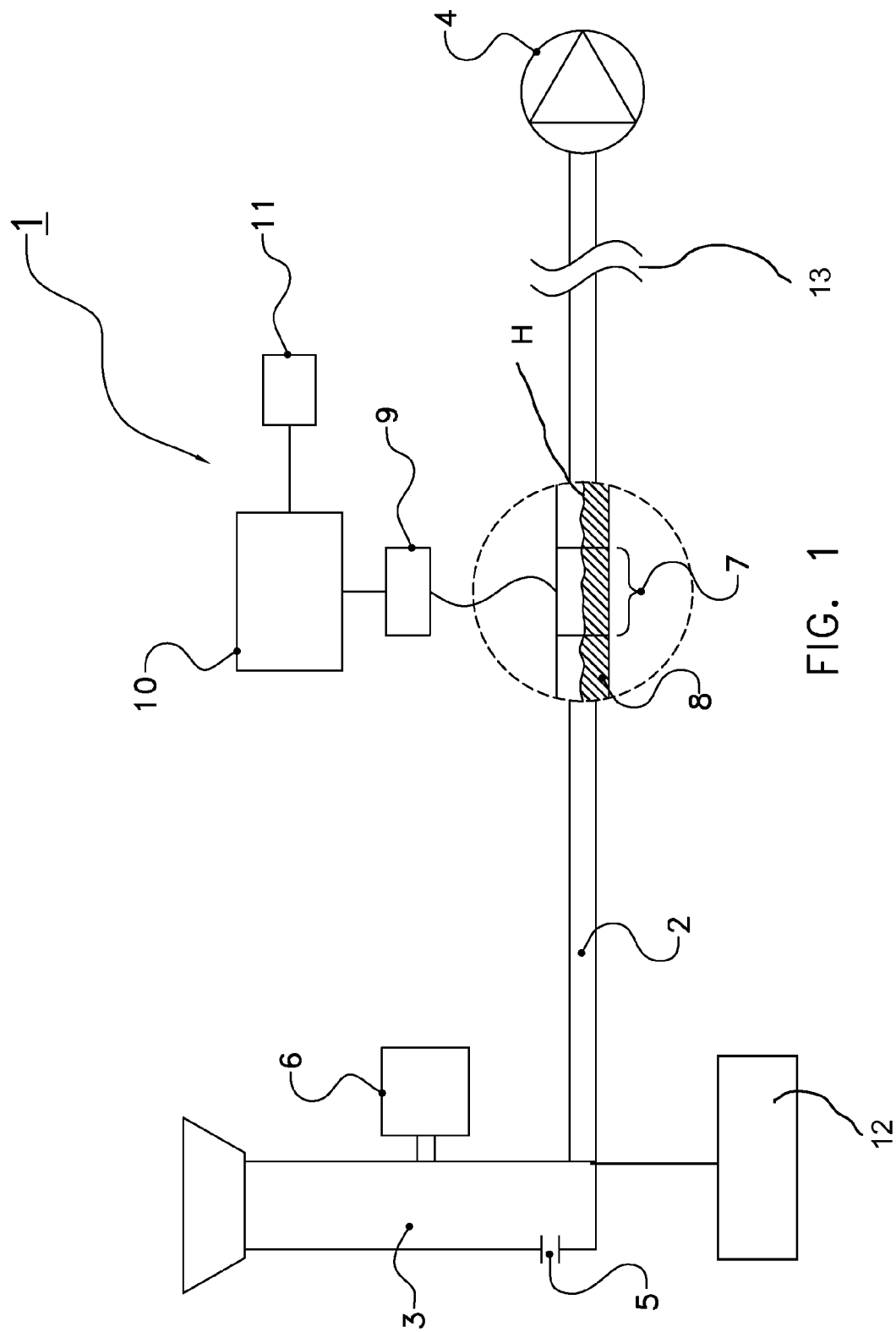
FIG. 1 shows in a schematic view a detection device according to the invention.

The following is a description of certain embodiments of the invention, given by way of example only and with reference to the drawings. FIG. 1 shows a detection device 1 and a milk line 2, both in a schematic view. A teat cup is denoted by 3, a vacuum pump by 4, an aeration hole by 5, and a pulsator by 6. A measuring section 7 contains milk 8 to a level which is measured by filling level detector 9, connected to a control device 10 and an alarm device 11. In this case, a part of the milk line 2 that comprises the measuring section 7 is shown in an enlarged view in the dashed line circle.

In the example shown, the milk line 2 has one side connected to a teat cup 3 and another side connected, directly or via further line portions schematically illustrated as 13, such as a milk glass or vacuum buffer with milk-air separator, to a pump 4. The pump 4 is, for example, a standard milking vacuum pump. The teat cup 3 and the milk line 2 form part of a automatic milking device 12, such as an automatic milking robot. It should be noted that, in this case, 'automatic' relates to the milking process sec. The connection of the teat cup(s) or milk cup(s) can be carried out manually or also automatically. During use of the milking device, the teat cup 3 is connected to a teat (not further shown) of a dairy animal, in particular of a cow. The pulsator 6 generates a pulsating vacuum inside the pulsation space of the teat cup, which pulsating vacuum periodically pushes the non-depicted liner of the teat cup onto the teat. As a result thereof, a pulsating milk transport from the teat of the dairy animal through the milk line 2 to a not further shown milk reservoir is generated. Pulsators, milk glasses, milk reservoirs, etcetera, are known to one of ordinary skill in the art, and for sake of brevity are not further discussed here.

In order to ensure a successful transport of the milk, there is provided an air supply opening 5 in the assembly of teat cup 3 and milk line 2. In particular, the air supply opening 5 may be provided in or near a curved connecting part which couples the teat cup 3 and the milk line 2 to each other. The air supply opening itself may be provided with a conduit, in order to provide the possibility to provide the air from elsewhere, in particular from a clean environment at a distance from the milking parlour. So-called leaking air can be supplied to the milk line 2 via the air supply opening 5. After the teat cup 3 has been connected to the teat of the dairy animal, the teat cup will discharge milk via the milk line 2. As a result thereof, the milk line 2 will fill with milk to a certain filling level H, i.e. the level of the milk surface in the milk line from a lower side of the line. The level H is measured in a measuring section 7 of the milk line. For this purpose, one or more measuring sensors may be provided, such as optical sensors which operate on the basis of the interruption of beams of light, conductivity sensors which operate on the basis of conductivity measured therebetween, etcetera. The thus measured filling level H is transferred as a signal by the filling level detector 9 to the control device 10. The latter processes the signal into an indicator number, and subsequently compares it with a threshold value. On the basis of the comparison, the control unit 10 can decide whether or not to emit an alarm signal by means of the alarm device 11. The latter can send a maintenance message to a computer, mobile telephone or the like of a managing person, or emit an acoustic, optical or otherwise perceptible signal.

Figure 2A:
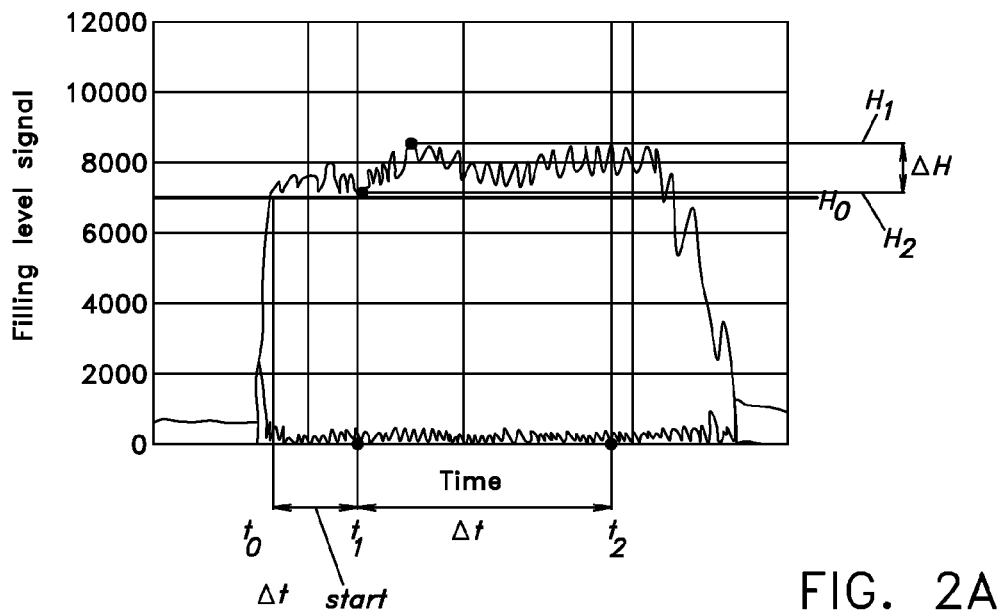
FIGS. 2A and 2B show schematically measured filling level signals during a normal milking, and a milking in the case of an obstructed air hole, respectively.
Figure 2B:
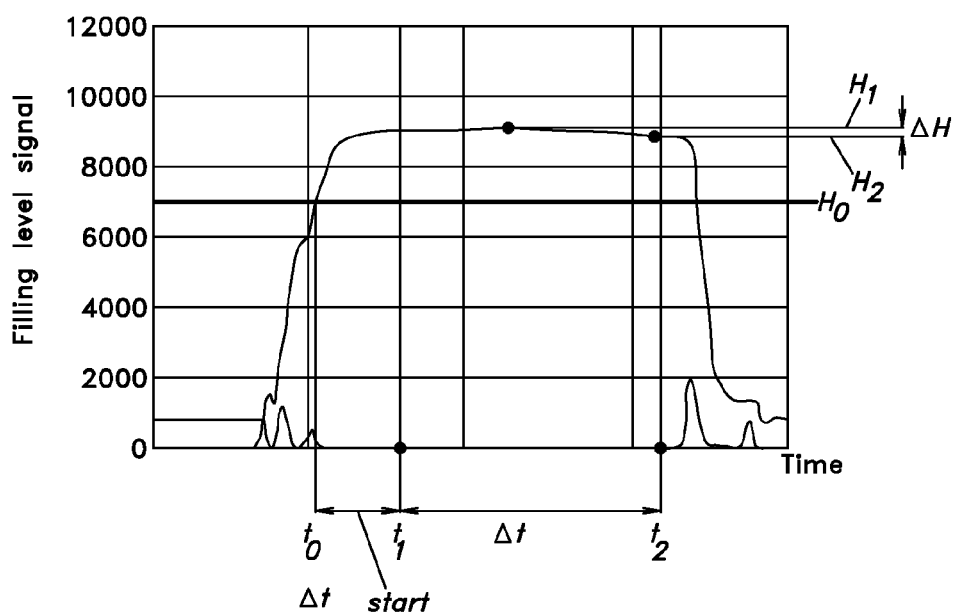

FIGS. 2A and 2B show the measured filling level signals during a normal milking, a milking in the case of an obstructed air hole, respectively. The (absolute value of the) derived function is shown as well.

During normal use of the milking device, the milk from the dairy animal is discharged through the milk line 2. Partially by the pulsating action of the generated vacuum, but in particular also by admitting leaking air into the milk line 2 via the air supply opening 5, a variation of the liquid or milk level H in the milk line 2 occurs. This is shown as the upper line in the diagram of FIG. 2A, in arbitrary units. The absolute value of the time-derived function is shown as a second line in the lower part of the diagram.

It is visible that the line, i.e. the filling level, has an irregular pattern. This irregularity is caused by air bubbles, irregular supply of air and, of course, also by irregular supply of milk itself. This irregularity shows that there must be a flow. As a measurement, this can for example be derived as follows. During a period of time $\Delta t$, from t1 to t2, the signal is measured and the maximum and minimum values, H1 and H2, respectively, are determined. A difference value $\Delta H$ is determined therefrom. In this embodiment, said difference value should be above a certain threshold to be able to establish a flow of milk. In other embodiments, the variation of H around an average value thereof should be above a threshold value during ($\Delta t$) In comparison with the former embodiment, this has the advantage that a single not flow-related variation does not give an impression of a flow.

Alternatively, it is possible for example to look at the (absolute value of the) time-derived ABS (dH/dt). This function should then have for example a maximum above a threshold, or an average value above a threshold, etcetera. All these embodiments and their geometric equivalents serve to establish a flow.

As a start time t1, it is possible to look at a time at which a certain start level H0 is exceeded. In FIG. 2A, this is point of time $t0+\Delta t_{start}$. This time $\Delta t_{start}$ serves to obtain a relatively stable situation, although an earlier start would also be possible, for example by adjusting H0. The selection of t2 can be determined by the desired reliability and/or reaction speed. If a very quick reaction to possible flow irregularities is required, $\Delta t$ will be selected as a small one, but if, on the contrary, a high reliability is required, $\Delta t$ will be selected as a large one.

FIG. 2B shows another diagram, in the case of no flow. The filling level signal is shown again as an upper line, with the absolute value of the derived function shown therebelow, also in arbitrary units. It is clearly visible that almost no variation occurs after the starting up. In this case, the maximum variation in the filling level signal H ($\Delta H$) is much smaller, and also the derived function has considerably smaller values. It will be obvious that, in this case, "no flow" should be established, and that an alarm signal can be generated.

It is pointed out that "no flow" can still mean two things, i.e. 1) there is no flow because milk is not present anyway, or 2) milk is present indeed, but does not flow. In the first case, in addition to a too small variation, a very low filling level signal will be measured. A possible alarm signal may then be an indication of an obstruction in the line, which obstruction is located before the measuring section, or may be an indication of an absence of milk supply, for example owing to a wrongly connected teat or the like. In the case of 2) there is indeed a filling level signal, for example above a second threshold such as H0, but there is neither a flow. This is, for example, an indication of an obstructed aeration opening.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A detection device for detecting a flow of milk in a milk line which is connected to a teat cup provided with a pulsator space and which has an aeration opening, wherein the milk defines a filling level in a measuring section of the milk line, wherein the detection device comprises:
- a detector which measures, during a first period of time, the filling level in the measuring section of the milk line and emits a filling level signal, and
- a control device with an input for receiving the filling level signal, which control device determines a variation of the filling level measured at least during the first period of time and provides an indicator number, and compares the indicator number with a predetermined threshold value, which threshold value is indicative of a presence or absence of a flow of milk in the milk line.

2. The detection device according to claim 1, wherein the first period of time amounts to at least 20 seconds.

3. The detection device according to claim 1, wherein the indicator number is one of the maximum variation, the variance or the standard deviation of the filling level measured at least during the first period of time.

4. The detection device according to claim 3, wherein the filling level measured at least during the first period of time is divided by an average of said measured filling level.

5. An automatic milking device for milking dairy animals, provided with at least one teat cup and with a detection device for detecting a flow of milk in a milk line which is connected to the at least one teat cup, which at least one teat cup is provided with a pulsator space and has an aeration opening, wherein the milk defines a filling level in a measuring section of the milk line, wherein the detection device comprises:
- a detector which measures, during a first period of time, the filling level in the measuring section of the milk line and emits a filling level signal, and
- a control member with an input for receiving the filling level signal, which control device determines a variation of the filling level measured at least during the first period of time in the form of an indicator number, and compares the indicator number with a predetermined threshold value, which threshold value is indicative of the presence or absence of a flow of milk in the milk line.

6. The automatic milking device according to claim 5, wherein the control member of the detection device emits an alarm signal if the indicator number is smaller than the threshold value and the filling level measured.

7. The automatic milking device according to claim 6, wherein the indicator number is smaller than the threshold value and the filling level averaged during the first period of time is above a filling level threshold value.

* * * * *